United States Patent [19]

Weitzman

[11] Patent Number: 4,662,948
[45] Date of Patent: May 5, 1987

[54] ON-SITE REMOVAL OF PCB AND DIOXINS FROM SOILS

[75] Inventor: Leo Weitzman, Cincinnati, Ohio

[73] Assignee: Electric Power Research Institute, Palo Alto, Calif.

[21] Appl. No.: 675,823

[22] Filed: Nov. 28, 1984
(Under 37 CFR 1.47)

[51] Int. Cl.⁴ .............................................. B08B 3/08
[52] U.S. Cl. .................................. 134/25.1; 134/42; 210/909
[58] Field of Search .............. 134/25.1, 25.5, 40, 134/42; 208/262; 210/909; 568/755

[56] References Cited

U.S. PATENT DOCUMENTS

| | | | |
|---|---|---|---|
| 2,999,816 | 9/1961 | Bennett et al. | 252/171 |
| 3,477,952 | 11/1969 | Baver et al. | 134/40 X |
| 3,734,774 | 5/1973 | Culpepper | 134/2 |
| 3,945,932 | 3/1976 | Figiel et al. | 134/40 X |
| 4,425,949 | 1/1984 | Rowe | 134/11 X |
| 4,447,541 | 5/1984 | Peterson | 568/755 X |
| 4,483,716 | 11/1984 | Heller | 134/42 X |
| 4,483,717 | 11/1984 | Olmsted et al. | 134/11 X |

OTHER PUBLICATIONS

Addis et al., "Proceedings: 1981 PCB Seminar", Sep. 1982, pp. 3–51.
McGraw–Edison Co., "Bulletin 83029", Sep. 1984, p. 2.

*Primary Examiner*—Arthur L. Corbin
*Attorney, Agent, or Firm*—Flehr, Hohbach, Test, Albritton & Herbert

[57] ABSTRACT

A method is provided for removing PCBs and/or dioxins from solids contaminated therewith comprising contacting such solids with a halogenated hydrocarbon and a polar solvent.

4 Claims, No Drawings

ON-SITE REMOVAL OF PCB AND DIOXINS FROM SOILS

The present invention is directed to a method for removing polychlorinated biphenyls (PCBs) and chlorinated dioxins from solid matter contaminated therewith. In particular, the present invention is directed to a method of removing PCBs and chlorinated dioxins from soil.

The class of compounds comprised of polychlorinated biphenyls (PCBs) has properties which make them ideal for various applications in heat transfer systems and electrical equipment. However, within the past two decades it has been proposed that PCBs, if mishandled, may cause serious health problems in the public at large, so their manufacture and use in commercial applications has been discontinued. However, due to the widespread past use of PCBs, government regulations have been promulgated to control those materials currently in use and to control the degree to which the general public is exposed thereto.

One of the substantial sources of PCB currently found is in waste transformer oil. Due to the servicing of a great number of such transformers, accidents have occurred which involve either the spillage of PCB-containing oils and/or fires involving PCB. Fires involving PCB may produce other dangerous substances, such as polychlorinated dibenzofurans. It is a particularly difficult problem to remove PCBs when they are spilled or absorbed into soils. Also, other contaminants may be spilled onto soils, such as dioxin, a by-product of the chemical defoliant 2,4,5-T.

It is therefore an object of the present invention to provide a method for removing PCBs and chlorinated dioxins from solid matter.

It is further an object of the present invention to provide a method for removing PCBs and chlorinated dioxins from solid matter using a liquid substance which is nontoxic, nonflammable, and highly recoverable.

These and other objects will be apparent from the following description and claims.

The present invention provides a method for removing polychlorinated biphenyls and chlorinated dioxins from solids contaminated therewith comprising the steps of contacting the solids with a liquid comprising a halogenated hydrocarbon; and separating the solid from the liquid.

The liquid used to wash the contaminated solids will comprise a halogenated hydrocarbon, many of which are commonly known as Freons. Such halogenated hydrocarbons may include methylene chloride, perchloroethylene, chlorinated toluenes, and chlorofluorocarbons. Preferably, a chlorofluorocarbon may be utilized, such as, 1,2-dichloro-1,2-difluoroethane, a commercially available compound.

The liquid may also comprise polar organic solvents. It is preferred that a minor amount of such polar organic solvents be used, since it appears that it improves the wettability of the contaminated solids, particularly soil, thus allowing the halogenated hydrocarbon to extract the PCBs and/or dioxin. Such polar organic solvents include lower alcohols and ketones. The preferred class of polar organic solvents comprises of the lower alcohols, in particular, methanol.

The particular proportions of the halogenated hydrocarbon carbon and organic solvent, when used, are not critical. It will be recognized, however, that a greater proportion of the halogenated hydrocarbon in the liquid will be desired to reduce the number of washings required to remove the contaminant. The appropriate proportions may be readily determined. Usually, the liquid will comprise in the range of 99-70% (volume) halogenated hydrocarbon and 1-30% polar organic solvent.

A preferred composition is a liquid consisting essentially of 99-70% by volume 1,2-dichloro-1,2-difluoroethane and 1-30% by volume methanol. According to the present method, solid matter contaminated with PCBs or dioxins may be treated by contacting the matter with the liquid, such as by washing, then separating the liquid from the solid matter. Depending upon the degree of contamination of the solid matter and on the concentration of the halogenated hydrocarbon in the liquid, one or more washings may be required to reduce the PCB and/or dioxin concentration to acceptable levels. For example, a mixture of 90% 1,2-dichloro-1,2-difluoroethane and 10% methanol will reduce the PCB concentration in soil contaminated to the level of 500mg/kg down to below 2mg/kg with approximately eight to ten washings at ambient air temperature. The solid matter may be soil, landfill, gravel, sand, clay and the like or mixtures thereof.

The liquid may be collected and reclaimed by known methods. The PCBs and/or dioxins in the liquid which have been extracted from the soil may be destroyed or disposed of by conventional methods known in the art. A particular advantage of the present invention is that soil may be decontaminated at the site of the contamination by transporting the liquid with a reclamation system on a mobile vehicle to the site of the contamination. Upon destruction of the PCB or dioxin the liquid may be recovered by standard distillation techniques and recycled for further use.

Given the herein-described embodiments of the present invention, various modifications and other embodiments will be apparent to those of ordinary skill in the art. These modifications and embodiments are intended to be within the scope of the present invention.

What is claimed is:

1. A method for removing polychlorinated biphenyls and dioxins from soil, landfill, gravel, sand, clay or a mixture thereof, contaminated with said biphenyls and/or said dioxins, comprising the steps of
   (a) contacting said soil, landfill, gravel, sand, clay or a mixture thereof with a liquid consisting essentially of 99-70% by volume halogenated hydrocarbon and 1-30% by volume of a polar solvent selected from the group consisting of lower alcohols and ketones; and
   (b) separating said liquid.

2. A method according to claim 1 wherein said halogenated hydrocarbon comprises a chlorofluorocarbon.

3. A method according to claim 1 wherein said polar solvent comprises methanol.

4. A method according to claim 3 wherein said halogenated hydrocarbon consists essentially of 1,2-dichloro-1,2-difluroethane.

* * * * *